UNITED STATES PATENT OFFICE.

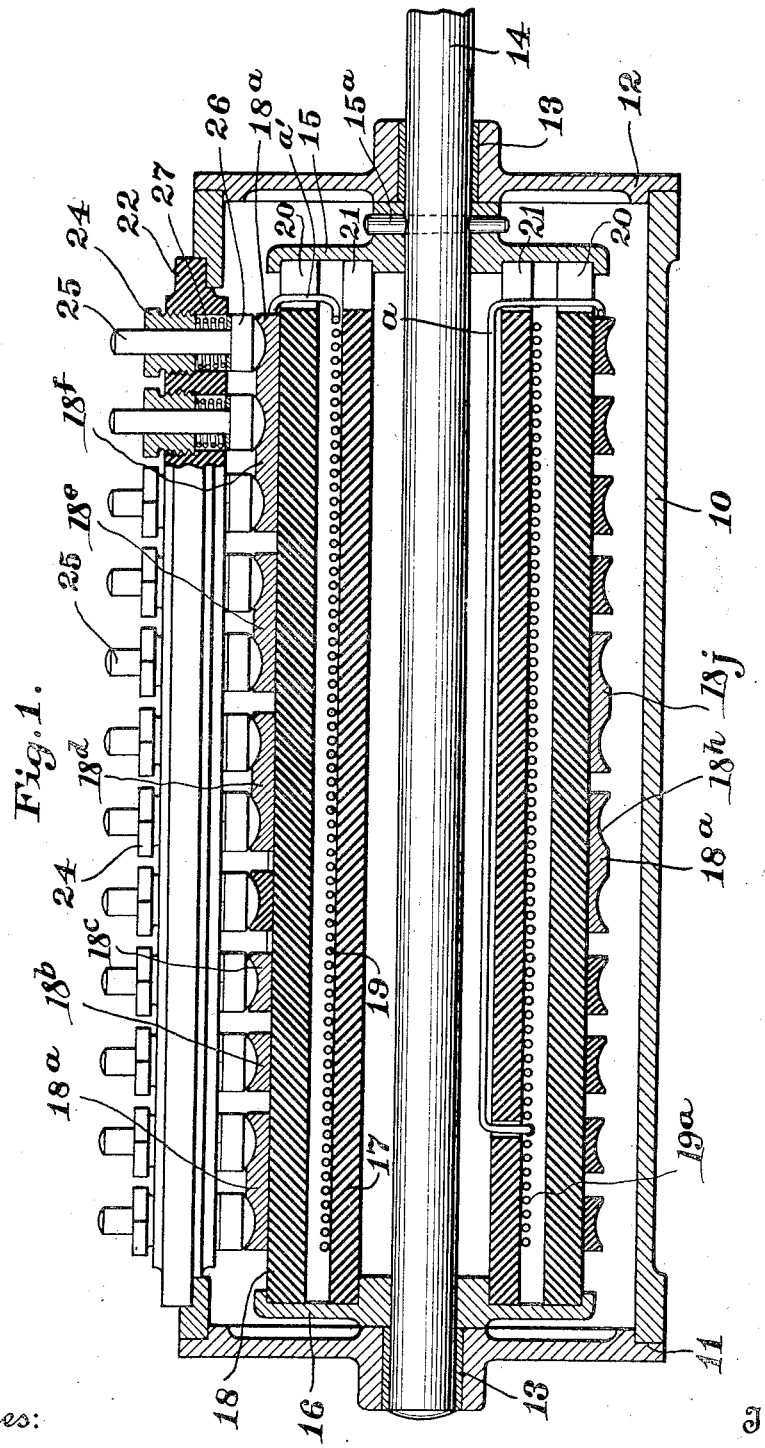

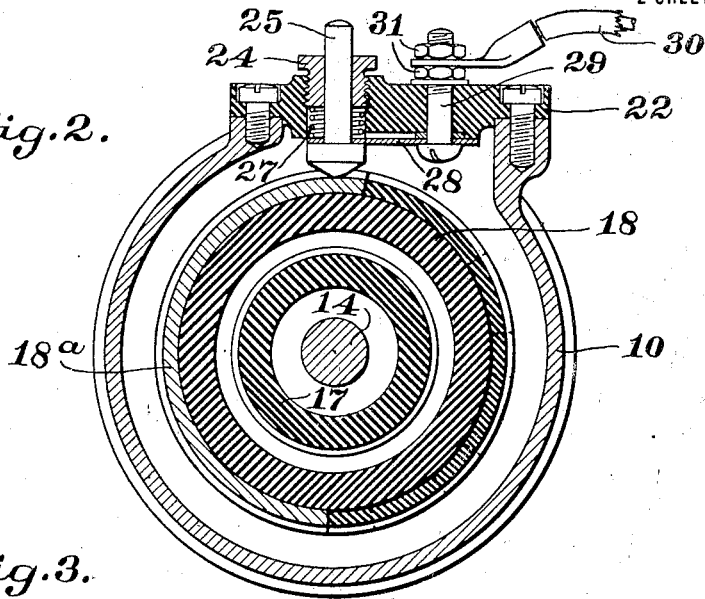
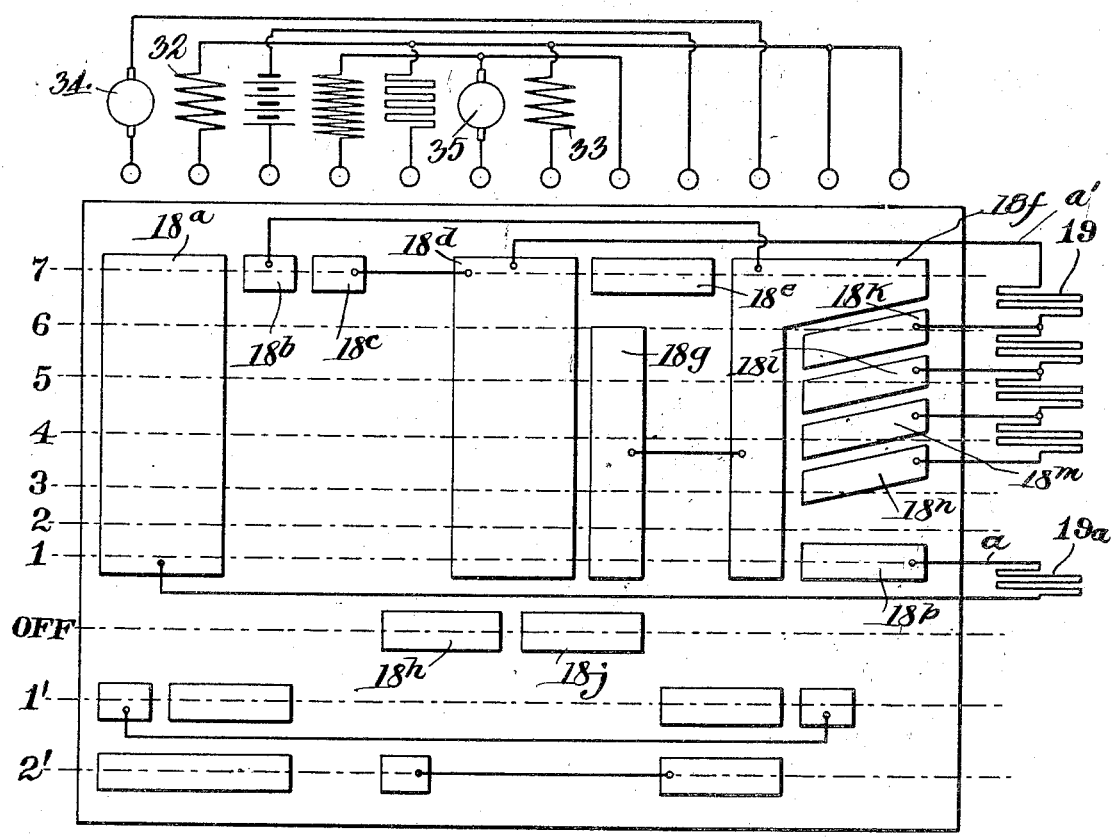

ROBERT W. STANLEY, OF CLEVELAND, OHIO, ASSIGNOR TO ENTZ MOTOR CAR CORPORATION, A CORPORATION OF NEW YORK.

ELECTRIC CONTROLLER.

1,289,059.  Specification of Letters Patent.  Patented Dec. 24, 1918.

Application filed October 7, 1914. Serial No. 865,425.

*To all whom it may concern:*

Be it known that I, ROBERT W. STANLEY, a citizen of the United States, and a resident of the city of Cleveland, county of Cuyahoga, State of Ohio, have invented certain new and useful Improvements in Electric Controllers, of which the following is a specification.

My invention relates to a controller for controlling the transmission of electrical energy and although it may be applied to the control of the transmission of electrical energy generally, is particularly useful in connection with motor vehicles.

The general objects of my invention are to provide such a controller which will be of simple, compact and durable construction, which will have a minimum number of movable parts, which shall be capable of ready adjustment, and which can be readily disassembled and reassembled when necessary.

Other objects and advantages will be apparent from the following specification and the claims appended thereto.

In the drawings:

Figure 1 shows a longitudinal section of my improved controller;

Fig. 2 is a transverse sectional view thereof; and

Fig. 3 is a development of such a controller.

The particular arrangement of contacts and circuits shown in Fig. 3 is merely illustrative of one of the many uses to which my improved controller may be put, and forms no part of my invention. Since a detailed description of these contacts and circuits is not necessary to a clear understanding of my invention, such description will be omitted from this specification. These contacts and circuits are described fully in the patent of Justus B. Entz, No. 1,207,732.

In the embodiment of my invention shown herein, 10 indicates a substantially cylindrical, or other suitably formed, shell having removable end plates 11, 12, each provided with a bearing 13 for the shaft 14. Surrounding the shaft 14 and held in position by the caps 15, 16, are the concentric, hollow, cylindrical drums 17, 18, of insulating material. One of the caps, as for instance cap 15, is removably secured to the shaft by some such means as the pin $15^a$. The other cap may be rigidly secured to the shaft. The inner drum 17 is for the purpose of carrying resistance coils such, for instance, as are shown diagrammatically at 19 and $19^a$, in Fig. 3, and the outer drum 18 is for the purpose of carrying contact segments $18^a$, $18^b$, $18^c$, etc. The leads from these resistance coils (see the lead marked $a$ in Fig. 1), preferably pass through holes in the drum 17, and thence along the interior of said drum to one end thereof, which may be provided with slots 21 in line with corresponding slots 20, in drum 18, so that the leads may be brought to the surface of the drum 18, and there connected with the proper contact segments. While only two slots 21 are visible in Fig. 1, it is understood that there are a sufficient number of such slots to accommodate all of the leads, from the interior of drum 17. The leads are thus entirely insulated from the resistance coils except for their single connection thereto and from each other in a very simple and effective manner. The plane of the section shown in Fig. 1 cuts, at the top the contacts segments $18^a$, $18^b$, $18^c$, $18^d$, $18^e$ and $18^f$, those being the segments which come into play when the controller is in position 7, as indicated in Fig. 3, and cuts at the bottom contact segments $18^h$ and $18^j$, those being the segments which come into play when the controller is in the "off" position. The conductor $a$, see Figs. 1 and 3, leads from one end of the resistance coil $19^a$ to the contact segment $18^p$ (not shown in Fig. 1), and the conductor $a'$ leads from one end of coil 19 to contact segment $18^d$, passing along the surface of drum 18 back of segments $18^f$, and $18^e$, and being, therefore, hidden by the drum as viewed in Fig. 1.

The shell 10 is provided at the top throughout substantially its entire length with a rectangular opening which is normally covered by the insulator cover plate 22, removably secured to the shell.

The bushings 24 are adapted to screw into suitable screw threaded openings in this plate. Each bushing acts as a guide for a contact finger 25, the enlarged end, 26, of which is adapted to coöperate with contact segments on the drum 18. Interposed between the bushing and the enlarged end of the contact finger is a spring 27, which normally presses the contact finger toward the contact segment. By reason of this construction the tension of any spring may be easily adjusted by merely screwing the bushing in or out, to vary the pressure of the corresponding contact finger against the contact segments.

Each contact finger is provided with an extension 28 of flexible conducting material, the end of which is normally held in contact with the lower end of a bolt 29 passing through the cover plate 22, as shown in Fig. 2. The lead 30 is secured to the upper end of the bolt 29, by some suitable means such as the nuts 31. By reason of this indirect connection between the contact finger and its lead, the pressure of the contact finger against the segments is not affected by any manipulation of the lead, while if the connection between the lead and the finger were direct, the effect of manipulation of the lead would be considerable. Extensions 28, while flexible, are preferably stiff enough to retain the contact fingers in place in the bushings 24 against springs 27 when the cover plate 22 is removed, thus permitting the removal of the cover plate fingers and springs as a unit, in which all of the parts remain in their assembled positions.

Any suitable means (not shown), such as bevel gearing, may be utilized to rotate the shaft 14 and the drums carried thereby. The effect of this rotation is to vary the electrical connections, depending upon the arrangement of the contact plates and the connections to the contact fingers.

The rotation of the controller, shown in Fig. 3, in the forward direction successively makes connections corresponding to positions 1 to 7, and its rotation in the reverse direction successively makes connections corresponding to positions 1' and 2'. As above indicated my invention is herein illustrated as applied to a transmission system such as that described in the aforesaid application of Justus B. Entz. As so applied, the controller serves, *inter alia*, to place resistance coil $19^a$ in shunt with the field 32 of one dynamo electric machine and to place the resistance 19 in shunt with the field 33 of another dynamo electric machine and to vary said last named resistance as desired. Thus, for example, in position 1, as indicated in Fig. 3, the main circuit runs from armature 34 to segment $18^a$, through field 32, field 33, segment $18^d$, armature 35, segment $18^g$, segment $18^f$ and back to armature 34, while the shunt circuit runs from one terminal of field 32 to segment $18^a$, through resistance coil $19^a$, to segment $18^p$, and back to the other terminal of the field 32. Assuming now that the controller is in position 4, the main circuit through the two dynamo-electric machines will remain unchanged, but instead of the coil $19^a$ being shunted around field 32, three-fourths of the coil 19 will be shunted around field 33. The shunt circuit will run from one terminal of field 33 to segment $18^d$, though three-fourths of coil 19 to segment $18^m$ and thence back to the other terminal of field 33. It is obvious that positions 3, 5 and 6 are the same as position 4, except that segment $18^n$, $18^l$ and $18^k$, respectively come into play instead of segment $18^m$, and the amount of resistance included in the shunt circuit is varied accordingly.

In the normal operation of the controller position, 3 precedes positions 4, 5 and 6, which follow consecutively, the amount of resistance included in the shunt circuit being thus gradually reduced from a maximum to a minimum.

The above description is included herein, merely as explanatory of the particular application of my invention illustrated, and it is to be distinctly understood that such description is not intended to in any way limit the scope of my invention.

The advantages of my controller over those heretofore used, are obvious. In the first place, the advantage of carrying the resistance on a member movable with the contact drum is important since it permits of rigid rather than sliding connections between the resistance and the proper contact segments. Further, by carrying the resistance within the drum, rather than on an extension thereof, I effect great economy of space, reducing the size of the controller substantially one-half.

It is also a simple matter to disassemble the parts of my controller in case of necessity. For instance, if there is some trouble with the resistance coils, such as a short circuit, the plate 12, pin $15^a$, and cap 15 may be removed, and the leads from the resistance to the contact segments severed at points on the surface of the drum 18. The drum 17 may then be withdrawn and repaired, or a new one may be substituted therefor. To replace the drum it is merely necessary to insert it within the drum 18, replace the members 15, $15^a$ and 12, and connect the leads at the points at which they were severed.

Another advantage resides in the fact that the parts are so arranged that the removal of the cover plate effects also the removal of the contact fingers and permits of free inspection of the controller drum.

Also, the external shell may be used as a receptacle for oil or other liquid, if it is desired to immerse the controller drum.

The peculiar method I have adopted for mounting the contact fingers and for securing the leads thereto has the advantages to which I have referred above with respect to the adjustability of the pressure of the fingers and the non-effect of manipulation of the leads on said pressure.

By running the leads from the resistance coils through the resistance drum and thence along the interior thereof, instead of running them over the top of the resistance coils I obviate the necessity of insulating the resistance wires, and at the same time eliminate all possibility of a short circuit between the resistance coils and the leads.

Other advantages will appear to those skilled in the art, and since I am aware that many changes may be made in the structure and arrangement of parts herein illustrated without sacrificing these advantages or departing from the spirit of my invention, or the scope of the claims, I wish it understood that I do not limit myself to any particular embodiment of my invention.

What I claim is:

1. A controller comprising a rotatable drum provided with contact segments, contact fingers adapted to coöperate with said segments, a second drum located within said first drum and adapted to rotate therewith, a resistance surrounding said second drum, and leads from said resistance passing through said second drum, thence along its interior to an end thereof, and thence to the surface of the first drum and along said surface to certain of said contacts.

2. A controller comprising an external shell which includes a removable cover plate, a rotatable drum inclosed within said shell and provided with contact segments, removable bushings mounted in said cover plate, and spring pressed contact fingers mounted in said bushings and adapted to coöperate with said segments.

3. A controller comprising an external shell which includes a pair of end plates one of which is removable and a removable cover plate, a shaft journaled in said end plates, two concentric drums surrounding said shaft and removably connected thereto and inclosed within said shell, contact segments carried by the outer drum, contact fingers mounted in said cover plate and adapted to coöperate with said segments, and a resistance surrounding the inner drum and connected to certain of said segments.

4. A controller comprising an external shell which includes a pair of end plates one of which is removable and a removable cover plate, a shaft journaled in said end plates, two concentric drums surrounding said shaft and removably connected thereto and inclosed within said shell, contact segments carried by the outer drum, removable bushings mounted in said cover plate, spring pressed fingers mounted in said bushings and adapted to coöperate with said segments and a resistance surrounding the inner drum and connected to said segments.

5. A controller comprising an external shell which includes a removable cover plate provided with screw-threaded openings, a rotatable drum inclosed within said shell and provided with contact segments, bushings adapted to screw into said openings, contact fingers guided in said bushings, said fingers being provided with enlarged ends adapted to coöperate with said contact segments, and springs interposed between said bushings and said enlarged ends.

6. A controller comprising an external shell which includes a removable cover plate, a rotatable drum within said shell and provided with contact segments, spring pressed contact fingers mounted in said cover plate, and adapted to coöperate with said segments, and means for connecting said fingers to their respective leads comprising bolts extending through said cover plate, means for connecting the leads to the upper end of said bolts at a point above the cover plate and flexible members below the cover plate having one end held stationary by the bolts and in contact with the lower end thereof, and the other end movable with the fingers.

7. A controller comprising an external shell which includes a removable cover plate, a rotatable drum within said shell carrying contact segments, spring pressed contact fingers mounted in said cover plate and adapted to coöperate with said segments, and means for retaining the fingers in the cover plate when the cover plate is removed comprising flexible members having one end fixed to the cover plate and the other end movable with the fingers.

In witness whereof I have hereto signed my name in the presence of two witnesses this 6th day of October, 1914.

ROBERT W. STANLEY.

Witnesses:
RALPH R. OWEN,
WALTER S. JONES.